Patented May 9, 1933

1,907,793

UNITED STATES PATENT OFFICE

ERNEST F. GRETHER, OF MIDLAND, MICHIGAN, ASSIGNOR TO THE DOW CHEMICAL COMPANY, OF MIDLAND, MICHIGAN, A CORPORATION OF MICHIGAN

AZO DYES FROM ORTHODICHLOROBENZENE DERIVATIVES

No Drawing.   Application filed November 4, 1929. Serial No. 404,874.

The present invention is concerned with azo dyes of the direct-developed type which may be produced by coupling diazo components into hydroxy aromatic carboxylic acid arylides derived from 3.4-dichloro-anilines and such acids, particularly 2.3-hydroxy-naphthoic acid.

It is well known that azo dyes which are fast to light and washing may be produced by coupling diazo components, i. e. diazotized aromatic amines, into arylides such as Naphthol AS, the latter being the anilide of 2.3-hydroxynaphthoic acid. I have now discovered that 3.4-dichloro-aniline and its substituted derivatives may be employed in the preparation of the above said arylides, and further more that new and useful dyes may be formed by coupling diazotized or polyazotized aromatic amino compounds into arylides derived from such 3.4-dichloroanilines and hydroxy aromatic acids by condensation or other suitable manner. The probable general formulas of such intermediates and dyes as derived from 3.4-dichloro-aniline and 2.3-hydroxynaphthoic acid may be represented as,

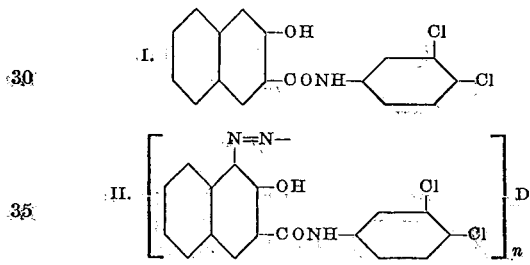

wherein Formula I represents the arylide coupling component, Formula II represents an azo dye derived from such arylide, D a residue from a diazo component, n equals the number of diazo groups in such diazo component, and wherein the several groups and residues may be further substituted.

My invention, then, consists of the steps and products hereinafter fully described and particularly pointed out in the claims, the following description setting forth but several of the various ways in which the principle of my invention may be used.

The herein described new arylides may be prepared from the aforementioned 3.4-dichloro-anilines and hydroxy aromatic acids, e. g. 2.3-hydroxynaphthoic acid, in any of the ordinary ways, for instance by condensing the amine and acid by means of phosphorus trichloride in the presence of toluene as a solvent and/or diluent.

The new azo dyes, of direct-developed type, may be formed from diazo components and the abovementioned arylides as coupling components, in any preferred way, such as by developing the aforesaid dyes on the fiber, by printing a diazo solution upon padded goods according to the well known method, by using nitrosamine salts of the corresponding bases, or by preparing such dyes in substance for use as pigments, etc. Mordanting or other auxiliary treatment for promoting the absorption of the dye on the fiber, or after-treatment with metallic salts such as chromium, copper or aluminum salts, for fixing the dye, modifying its color tone, or improving the fastness of the dye, may be optionally employed in conjunction with the dyeing operation without departing from the spirit of the invention which is intended to include not only the dyes themselves, but also materal dyed therewith.

A preferred manner in which my invention may be carried out is illustrated in the following specific examples.

Example 1

The 2.3-hydroxynaphthoic acid arylide of 3.4-dichloroaniline is prepared by condensing said acid and amine with the aid of phosphorus trichloride in the presence of toluene in the usual manner, whereby the desired arylide forms as a solid phase intermixed with a liquid medium. The melting point of the purified arylide was found to be 255° C.

Cotton yarn is impregnated with a slightly alkaline solution of the above arylide to which may be added advantageously but not necessarily, formaldehyde and/or other fixative, e. g. turkey-red oil or an aluminum salt. Said yarn is then immersed in a diazo solution derived from 2-methyl-4-chloroaniline. The dye develops on the fiber and has a scarlet color, the formula brings:—

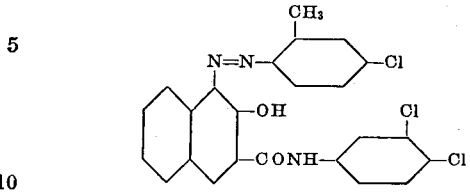

*Example 2*

In a manner similar to that described in Example 1, dianisidine is tetrazotized and coupled into the same arylide, the dye which develops on the fiber, being Homage blue in color. The formula for the dye is:—

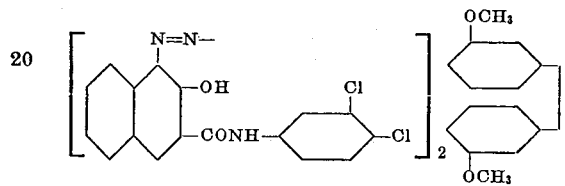

*Example 3*

Similarly, as described in Example 1, 2-nitro-4-ethoxy-aniline is diazotized and coupled into the same arylide. The dye is dark cardinal in color, the probable formula being:—

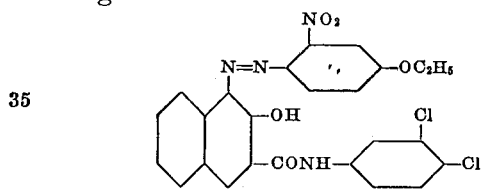

The "Standard Color Card of America" (1928 Ed.) issued by "The Textile Color Card Association of the United States, Inc." is used to designate the colors of the above dyes.

In like fashion, I have prepared other dyes of the same general type from the abovementioned arylides, by coupling thereinto other diazo components, e. g. 2-chloro-4-nitraniline, 3.4-dichloro-6-nitraniline, and aminonaphthyl-phenyl ether.

The dyes of the present invention dye fibers in clear, bright, and fast shades, the color depending on the particular diazo component employed. While cotton fibers have been referred to in the examples as the material to be dyed with the herein described new dyes, other natural or synthetic fibers may likewise be dyed therewith, such as silk, wool, rayon, and the like.

Furthermore, I do not limit my invention to the specifically aforementioned intermediates. As diazo components, any diazotized or polyazotized aromatic amino or polyamino compounds or their substitution products or derivatives suitable for use in preparing azo dyes, may be employed for combining with the herein described coupling components or arylides derived from other similar amines, i e. the bromo derivatives analogous to the specifically mentioned chloro compounds. Moreover, the several groups and residues of such arylides may be further substituted as by alkyl or halogen groups.

Other hydroxy aromatic acids or their substitution products thereof, e. g. halogen, nitro, and/or alkyl derivatives, likewise may be employed as arylide components.

In brief, my invention involves arylides of the type:—

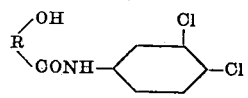

wherein R represents an aromatic residue, and also azo dyes produced therefrom.

Other modes of applying the principle of my invention may be employed instead of the one explained, change being made as regards the details employed, provided the steps or ingredients stated by any of the following claims or the equivalent of such be employed.

I therefore particularly point out and distinctly claim as my invention:—

1. The method of making an azo dye, which comprises coupling an arylide of the general formula,

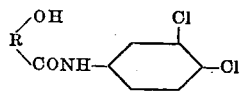

wherein R represents an aromatic residue of the benzene or naphthalene series, and wherein the several groups and residues may be further substituted by substituents selected from the group consisting of alkyl and halogen substituents, with a diazotized aromatic amino compound.

2. An azo dye of the general formula,

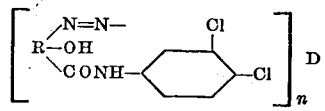

wherein R represents an aromatic residue of the benzene or naphthalene series, D the residue from a diazotized aromatic amino compound, $n$ is the number of diazo groups in the latter, and wherein the several groups and residues may be further substituted by substituents selected from the group consisting of alkyl and halogen substituents.

3. The method of making an azo dye, which comprises coupling an arylide of the general formula,

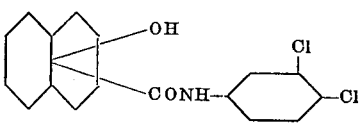

with a diazotized aromatic amino compound.

4. An azo dye of the general formula,

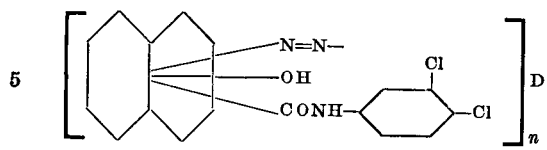

wherein D represents the residue of a diazotized aromatic amino compound and $n$ is the number of diazo groups in the latter.

5. An azo dye of the general formula,

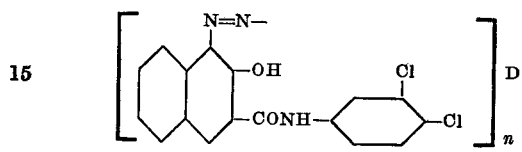

wherein D represents the residue of a diazotized aromatic amino compound and $n$ is the number of diazo groups in the latter.

6. An azo dye of the general formula,

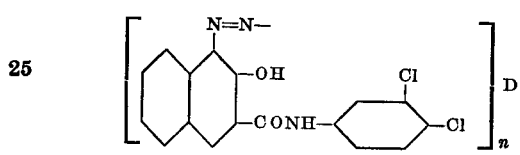

wherein D represents the residue of a diazotized aromatic amino compound and $n$ is the integer 1 or 2.

7. An azo dye of the general formula,

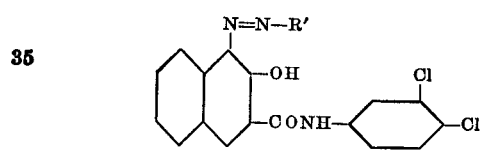

wherein R' represents the residue of a diazotized chloro-aniline.

8. The method of making an azo dye, which comprises coupling an arylide having probably the formula

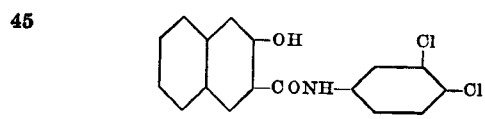

with a diazotized aromatic amino compound.

9. An azo dye having the general formula

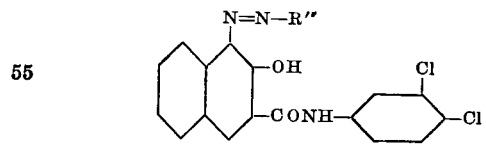

wherein R'' represents the residue of a diazotized aromatic amino compound.

10. Fiber dyed with a dye as claimed in claim 2.

11. Fiber dyed with a dye as claimed in claim 4.

12. Fiber dyed with a dye as claimed in claim 5.

13. Fiber dyed with a dye as claimed in claim 6.

14. Fiber dyed with a dye as claimed in claim 7.

Signed by me this 26th day of October, 1929.

ERNEST F. GRETHER.